United States Patent
Beutel et al.

(10) Patent No.: US 10,211,477 B2
(45) Date of Patent: Feb. 19, 2019

(54) FUEL CELL STACK ASSEMBLY

(71) Applicant: GM GLOBAL TECHNOLOGY OPERATIONS LLC, Detroit, MI (US)

(72) Inventors: Matthew J. Beutel, Webster, NY (US); Jeffrey D. Williams, Tonawanda, NY (US); Robert C. Thompson, Lockport, NY (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 34 days.

(21) Appl. No.: 15/232,967

(22) Filed: Aug. 10, 2016

(65) Prior Publication Data
US 2018/0048012 A1    Feb. 15, 2018

(51) Int. Cl.
| | |
|---|---|
| *H01M 8/24* | (2016.01) |
| *H01M 8/023* | (2016.01) |
| *H01M 8/0267* | (2016.01) |
| *H01M 8/0273* | (2016.01) |
| *H01M 8/241* | (2016.01) |
| *H01M 8/0263* | (2016.01) |
| *H01M 8/0265* | (2016.01) |
| *H01M 8/1018* | (2016.01) |

(52) U.S. Cl.
CPC ............ *H01M 8/24* (2013.01); *H01M 8/023* (2013.01); *H01M 8/0263* (2013.01); *H01M 8/0265* (2013.01); *H01M 8/0267* (2013.01); *H01M 8/0273* (2013.01); *H01M 8/241* (2013.01); *H01M 2008/1095* (2013.01); *H01M 2250/20* (2013.01)

(58) Field of Classification Search
CPC ...... H01M 8/24; H01M 8/023; H01M 8/0267; H01M 8/0273
See application file for complete search history.

(56) References Cited

U.S. PATENT DOCUMENTS

| | | | |
|---|---|---|---|
| 6,261,710 | B1 | 7/2001 | Marianowski |
| 6,503,653 | B2 | 1/2003 | Rock |
| 8,828,617 | B2 | 9/2014 | Martin et al. |
| 2010/0143763 | A1 | 6/2010 | Haltiner, Jr. et al. |
| 2011/0171562 | A1 | 7/2011 | Budinski et al. |
| 2011/0254198 | A1 | 10/2011 | Abd Elhamid et al. |
| 2012/0156584 | A1* | 6/2012 | Uehara ............... H01M 8/0247 429/465 |

FOREIGN PATENT DOCUMENTS

| | | | | |
|---|---|---|---|---|
| DE | 102007048184 B3 | * | 1/2009 | ............. C25B 9/203 |

OTHER PUBLICATIONS

Machine translation DE102007048184B3.*
Machine translation DE102007048184B3 (Year: 2009).*

* cited by examiner

*Primary Examiner* — Jonathan G Leong
*Assistant Examiner* — Victoria H Lynch

(57) ABSTRACT

A fuel cell stack assembly is provided which includes a first bipolar plate, a second bipolar plate, a sub-gasket, and a gas diffusion layer. The second bipolar plate may define a bypass channel with the first bipolar plate. The bypass channel includes at least one embossment formed therein. The gas diffusion layer may be disposed between the first bipolar plate and the second bipolar plate while the sub-gasket is sandwiched between metal bead seals formed in each of the first bipolar plate and the second bi-polar plate.

15 Claims, 10 Drawing Sheets

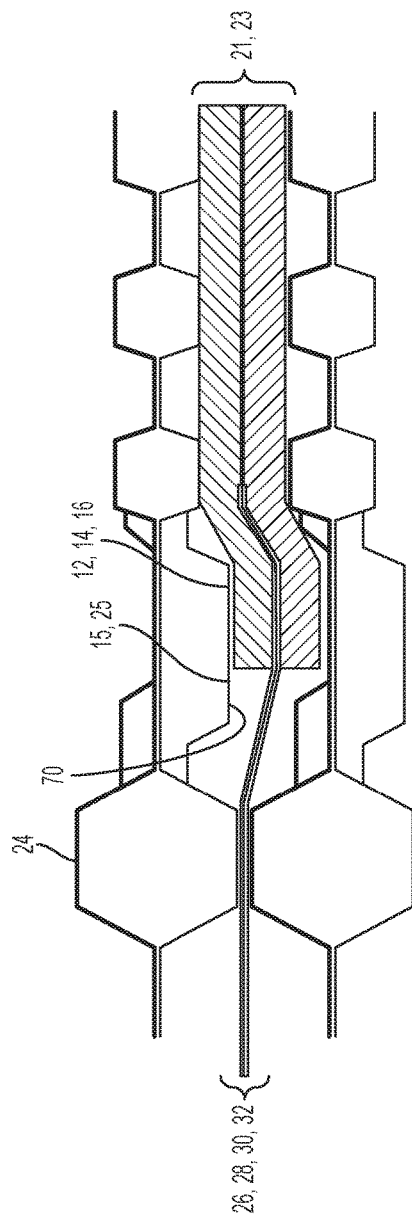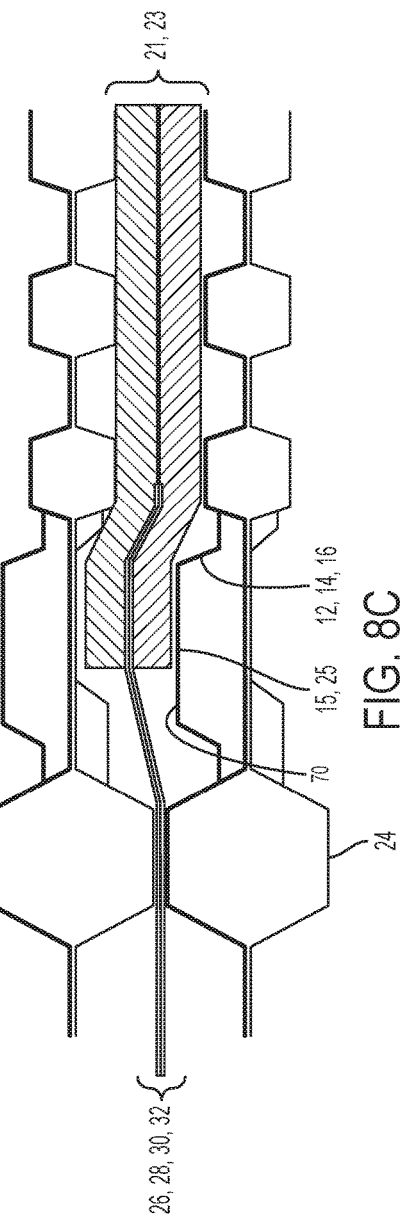

FUEL CELL STACK ASSEMBLY

TECHNICAL FIELD

This present disclosure relates generally to PEM fuel cells and more particularly to bipolar plates for separating adjacent fuel cells in a fuel cell stack.

BACKGROUND

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive, solid polymer electrolyte membrane having the anode catalyst on one face and the cathode catalyst on the opposite face. The MEA is sandwiched between a pair of non-porous, electrically conductive elements or plates which (1) pass electrons from the anode of one fuel cell to the cathode of the adjacent cell of a fuel cell stack, (2) contain appropriate channels and/or openings formed therein for distributing the fuel cell's gaseous reactants over the surfaces of the respective anode and cathode catalysts; and (3) contain appropriate channels and/or openings formed therein for distributing appropriate coolant throughout the fuel cell stack in order to maintain temperature.

The term "fuel cell" is typically used to refer to either a single cell or a plurality of cells (stack) depending on the context. A plurality of individual cells are typically bundled together to form a fuel cell stack and are commonly arranged in electrical series. Each cell within the stack includes the membrane electrode assembly (MEA) described earlier, and each such MEA provides its increment of voltage. A group of adjacent cells within the stack is referred to as a cluster. By way of example, some typical arrangements for multiple cells in a stack are shown and described in U.S. Pat. No. 5,663,113. In PEM fuel cells, hydrogen (H2) is the anode reactant (i.e., fuel) and oxygen is the cathode reactant (i.e., oxidant). The oxygen can be either a pure form (O2) or air (a mixture of O2 and N2).

The electrically conductive plates sandwiching the MEAs may contain an array of grooves in the faces thereof that define a reactant flow field for distributing the fuel cell's gaseous reactants (i.e., hydrogen and oxygen in the form of air) over the surfaces of the respective cathode and anode. These reactant flow fields generally include a plurality of lands that define a plurality of flow channels therebetween through which the gaseous reactants flow from a supply header at one end of the flow channels to an exhaust header at the opposite end of the flow channels. The reactant flow field is predetermined flow field pattern directly adjacent to a face of the gas diffusion layer to encourage a reaction between.

In a fuel cell stack, a plurality of cells are stacked together in electrical series while being separated by a gas impermeable, electrically conductive bipolar plate. In some instances, the bipolar plate is an assembly formed by securing a pair of thin metal sheets having reactant flow fields formed on their external face surfaces. Typically, an internal coolant flow field is provided between the metal plates of the bipolar plate assembly. It is also known to locate a spacer plate between the metal plates to optimize the heat transfer characteristics for improved fuel cell cooling.

Typically, the cooling system associated with a fuel cell stack includes a circulation pump for circulating a liquid coolant through the fuel cell stack to a heat exchanger where the waste thermal energy (i.e., heat) is transferred to the environment. The thermal properties of typical liquid coolants require that a relatively large volume be circulated through the system to reject sufficient waste energy in order to maintain the temperature of the stack within an acceptable range, particularly under maximum power conditions.

Fuel cells have been proposed as a clean, efficient, and environmentally responsible power source for electric vehicles and various other applications. In particular, fuel cells have been identified as a potential alternative for the traditional internal-combustion engine used in modern automobiles.

A common type of fuel cell is known as a proton exchange membrane (PEM) fuel cell. The PEM fuel cell includes a unitized electrode assembly (UEA) disposed between a pair of fuel cell plates such as bipolar plates, for example. The UEA may include diffusion mediums (also known as a gas diffusion layer) disposed adjacent to an anode face and a cathode face of a membrane electrolyte assembly (MEA). The MEA includes a thin proton-conductive, polymeric, membrane-electrolyte having an anode electrode film formed on one face thereof, and a cathode electrode film formed on the opposite face thereof. In general, such membrane-electrolytes are made from ion-exchange resins, and typically comprise a perfluoronated sulfonic acid polymer such as NAFION™ available from the E.I. DuPont de Nemeours & Co. The anode and cathode films, on the other hand, typically comprise (1) finely divided carbon particles, very finely divided catalytic particles supported on the internal and external surfaces of the carbon particles, and proton conductive material (e.g., NAFION™) intermingled with the catalytic and carbon particles, or (2) catalytic particles, sans carbon, dispersed throughout a polytetrafluoroethylene (PTFE) binder.

The MEA may be sandwiched between sheets of porous, gas-permeable, conductive material which press against the anode and cathode faces of the MEA and serve as (1) the primary current collectors for the anode and cathode, and (2) mechanical support for the MEA. Suitable such primary current collector sheets or gas diffusion mediums may comprise carbon or graphite paper or cloth, fine mesh noble metal screen, and the like, as is well known in the art.

The formed-sandwich is pressed between a pair of electrically conductive plates (hereinafter referred to as "bipolar plates") 12, 14, 16 which serve as secondary current collectors for collecting the current from the primary current collectors and conducting current between adjacent cells (i.e., in the case of bipolar plates) internally of the stack, and externally of the stack in the case of monopolar plates at the ends of the stack. The bipolar plates each contain at least one so-called "flow field" that distributes the fuel cell's gaseous reactants (e.g., $H_2$ and $O_2$/air) over the surfaces of the anode and cathode. The reactant flow field includes a plurality of lands which engage the gas diffusion layer and define therebetween a plurality of flow channels through which the gaseous reactants flow between a supply manifold and an exhaust manifold in the bipolar plates. Serpentine flow channels may, but not necessarily, be used in the flow field 18 and connect the supply and exhaust manifolds only after having made a number of hairpin turns and switch backs such that each leg of the serpentine flow channel borders at least one other leg of the same serpentine flow channel. It is understood that various configurations may be used for the flow channels.

Therefore, it is desirable in the industry to provide a mechanism for encouraging better distribution of the reactant gases toward the gas diffusion layer instead of the bypass channel which operates outside of the active flow channels. In this manner, a higher reaction rate for the fuel stack can be achieved, thereby improving the efficiency and durability of the fuel stack.

SUMMARY OF THE INVENTION

Accordingly, the present disclosure provides a fuel cell plate assembly for channeling reactants through a PEM fuel cell such that a greater reaction rate may occur between the gas diffusion layer and the reactants.

A fuel cell stack assembly of the present disclosure includes a first bipolar plate, a second bipolar plate, first and second sub-gaskets, and a gas diffusion layer. Is understood that the gas diffusion layer may have a sandwich construction with an MEA disposed between two gas diffusion mediums. A bypass channel outside of the active flow field is provided. The bypass channel may be provided in various ways. For example, the second bipolar plate may define a bypass channel with the first bipolar plate where the bypass channel is formed in an inner metal element adjacent to the lateral edge of the gas diffusion layer. It is also understood that a bypass channel outside of the active flow channels may be formed by creating a gap or channel adjacent to the gas diffusion layer due to the change in thickness between the gas diffusion layer and the sub-gasket. Regardless of the configuration, the bypass channel further includes at least one embossment formed therein. The gas diffusion layer may be disposed between the first bipolar plate and the second bipolar plate while the first and second sub-gaskets are disposed on each side of the gas diffusion layer such that the first and second sub-gaskets are secured between the metal bead seals of two bipolar plates. GDL, layers thicker than SG or as was stated in parenthesis.

The fuel cell plate assembly may further include an inner metal element for each bipolar plate where each inner metal element defines a reactant flow field and a coolant flow field. The inner metal element further defines at least one bypass channel wherein a plurality of vertical embossments (protrusions/recesses or tunnels) may be formed along the length of the bypass channel in order to disrupt the flow of the reactant as the reactant travels in the bypass channel. Therefore, the embossments encourage flow of the reactant from the inlet toward the gas diffusion layer, rather than directly to the outlet via the bypass channel.

The present invention enables better distribution or diversion of the flow from bypass back to active area of the reactant toward the gas diffusion layer, thereby enabling optimization of the reaction over the entire active area which, by definition, increases the efficiency of the fuel cell stack.

The invention and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description of preferred embodiments, and best mode, appended claims, and accompanying drawings in which:

FIG. 8B is a cross sectional view of an embodiment of the present disclosure showing a cross-sectional view of a portion of the bypass channel where the gas diffusion layer and the sub-gasket are bent in a second direction within the channel.

FIG. 8C is a cross sectional view of an embodiment of the present disclosure showing a cross-sectional view of a portion of the bypass channel where the gas diffusion layer and the sub-gasket are bent in a first direction within the channel.

Like reference numerals refer to like parts throughout the description of several views of the drawings.

DETAILED DESCRIPTION OF THE INVENTION

The exemplary embodiments described herein provide detail for illustrative purposes, and are subject to many variations in composition, structure, and design. It should be emphasized, however, that the present disclosure is not limited to a particular arrangement as shown and described. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein are for the purpose of description and should not be regarded as limiting.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced items.

Figure 1A:
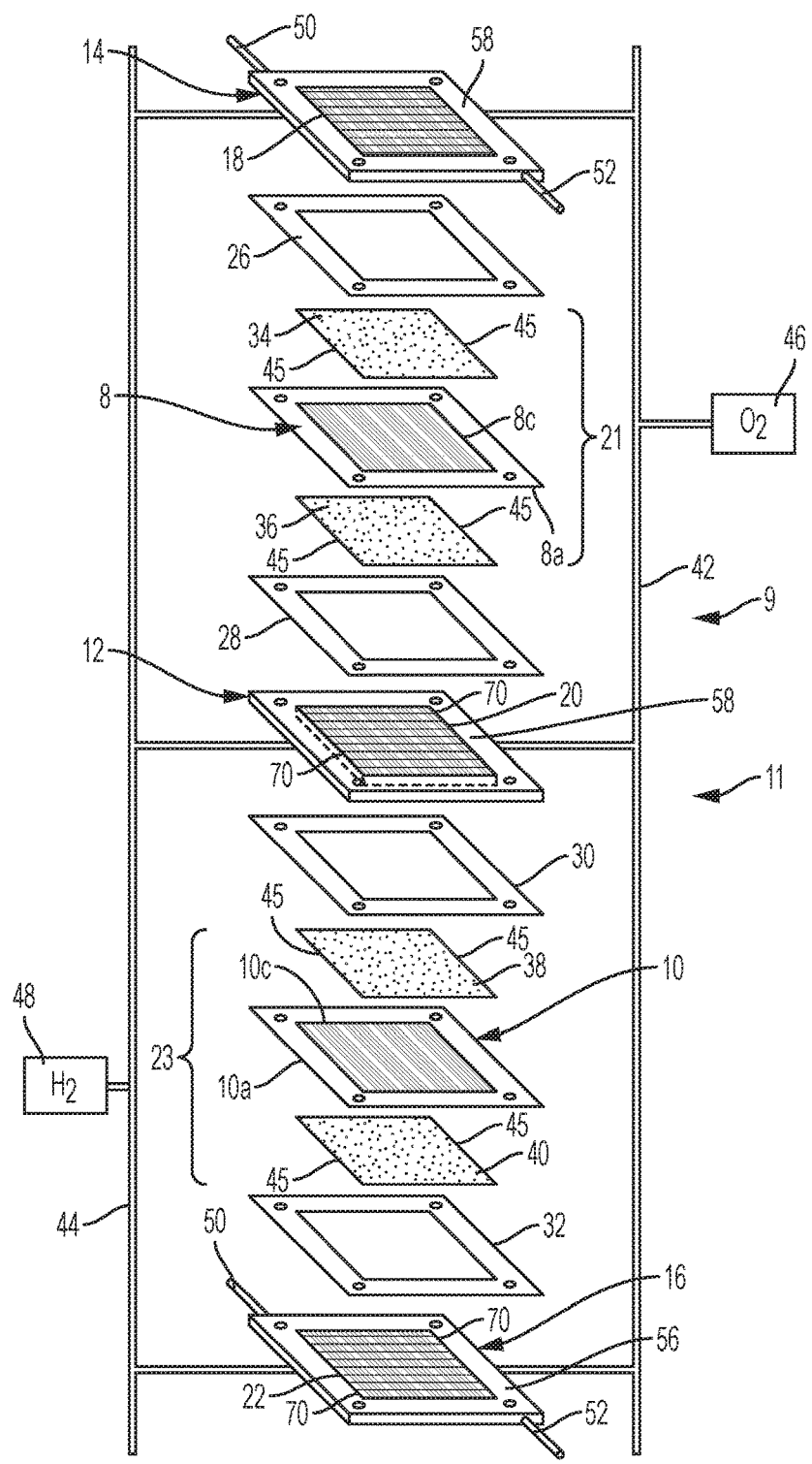
FIG. 1A is an expanded, schematic view of a PEM fuel cell stack.
Figure 5:
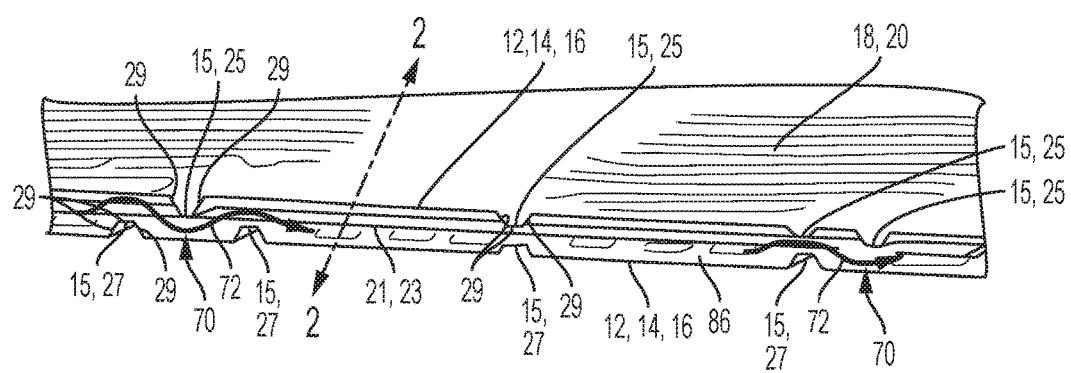
FIG. 5 is an isometric, schematic, cross-sectional view of a third non-limiting example of a PEM fuel cell stack of the present disclosure.

The present disclosure provides for a PEM fuel stack wherein the reactant bypass gas flow 72 (shown in FIG. 5)

within each bypass channel 70 may be restricted in multiple areas along the length of each bypass channel 70 due to embossments 15 which may extend into the bypass channel 70. FIG. 1A schematically depicts a partial PEM fuel cell stack 11 having a pair of membrane-electrode-assemblies (MEAs) 8 and 10 separated from each other by a non-porous, electrically-conductive bipolar plate 12. Each of the MEAs 8, 10 have a cathode face 8c, 10c and an anode face 8a, 10a. The MEAs 8 and 10, and bipolar plate 12, are stacked together between non-porous, electrically-conductive, liquid-cooled bipolar plates 14 and 16. The bipolar plates 12, 14 and 16 each include flow fields 18, 20 and 22 formed in the faces of bipolar plates 12, 14, 16 for distributing fuel and oxidant gases (i.e., $H_2$ & $O_2$) to the reactive faces of the MEAs 8, 10.

Sub-gaskets 26, 28, 30, 32 provide a seal and electrical insulation between the several bipolar plates 12, 14, 16 of the fuel cell stack 11. Porous, gas permeable, electrically conductive sheets (gas diffusion mediums) 34, 36, 38 and 40 press up against the electrode faces of the MEAs 8 and 10 and serve as primary current collectors for the electrodes. As shown in FIG. 1, each sub-gasket 26, 28, 30, 32 defines an internal periphery 41 for the corresponding gas diffusion medium 34, 36, 38, 40. Gas diffusion mediums 34, 36, 38 and 40 also provide mechanical supports for the MEAs 8 and 10, especially at locations where the MEAs are otherwise unsupported in the flow field. Suitable gas diffusion mediums 34, 36, 38, 40 include carbon/graphite paper/cloth, fine mesh noble metal screens, open cell noble metal foams, and the like which conduct current from the electrodes while allowing gas to pass therethrough. However, it is understood that throughout the present disclosure and in the schematic drawings, the gas diffusion layers 21, 2.3 may actually represent the MEA 8 sandwiched between two gas diffusion mediums as shown in FIG. 1A.

It is understood that the gas diffusion layer 21, 23 may be a porous structure made by weaving carbon fibers into a carbon cloth (e.g. GDL-CT and ELAT) or by pressing carbon fibers together into a carbon paper (e.g. Sigracet, Freudenberg, and Toray). Many of the standard GDLs that are produced today come with a Micro Porous layer (MPL) and hydrophobic treatment (PTFE). The MPL and PTFE help with the contact to the membrane and with water management. The MPL typically provides a smooth layer with plenty of surface area for catalyst and good contact with the membrane. The MPL often uses PTFE as a binder that increases hydrophobicity, which helps keep the water within the membrane from escaping—drying out the membrane and causing higher resistance (lower performance).

Bipolar plates 14 and 16 press up against the gas diffusion medium 34 on the cathode face 8c of MEA 8 and gas diffusion medium 40 on the anode face 10a of MEA 10, while the bipolar plate 12 presses up against the gas diffusion medium 36 on the anode face 8a of MEA 8 and against the gas diffusion medium 38 on the cathode face 10c of MEA 10. An oxidant gas such as oxygen or air is supplied to the cathode side of the fuel cell stack from a storage tank 46 via appropriate supply plumbing 42. Similarly, a fuel such as hydrogen is supplied to the anode side of the fuel cell from a storage tank 48 via appropriate supply plumbing 44. In another embodiment, the oxygen tank 46 may be eliminated, and air supplied to the cathode side from the ambient. Likewise, the hydrogen tank 48 may alternatively be eliminated and hydrogen may be supplied to the anode side from a reformer which catalytically generates hydrogen from methanol or a liquid hydrocarbon (e.g., gasoline).

Exhaust plumbing (not shown) for both the 112 and $O_2$/air sides of the MEAs may also provide for removing $H_2$-depleted anode gas from the anode flow field and $O_2$-depleted cathode gas from the cathode flow field. Coolant plumbing 50, 52 is provided for supplying and exhausting liquid coolant to the bipolar plates 14, 16 as needed. It is understood that each of the inner metal elements 56 of the bipolar plates 12, 14, 16 define flow fields 18 such that a serpentine flow channel may be formed between the inner and outer metal elements 56, 58 for a coolant flow field 20. Moreover, flow fields 18 are also provided in the inner metal element 56 such that the input reactant gas is guided along the surface of the gas diffusion layer 21, 23 for each fuel cell.

The bypass channel 70 outside of the active flow channels 18 may be formed in a variety of different ways. For example, the second bipolar plate 14 may define a bypass channel 70 with the first bipolar plate 12 where the bypass channel 70 is formed in an inner metal element 56 adjacent to the lateral edge of the gas diffusion layer 21, 23. It is also understood that a bypass channel 70 outside of the active flow channels 18 may be formed by creating a gap or channel adjacent to the gas diffusion layer 21, 23 due to the change in thickness between the gas diffusion layer 21, 23 and the sub-gasket 26, 28. This change in thickness may occur where the gas diffusion layer 21,23 thickness is greater than that of the sub-gaskets 26, 28 or where the sub-gasket 26, 28 thickness is greater than the gas diffusion layer 21, 23 thicknesses. When the thickness of the gas diffusion layer 21, 23 is greater than that of the sub-gaskets 26, 28, the benefits of the first and second plate embossments 25, 27 are pronounced given that the first plate embossment and second plate embossments 25, 27 create a "step down" from sub-gasket 26, 28 thickness to meet gas diffusion layer 25, 27 thickness thereby creating a larger bypass gap.

Regardless of the configuration, the bypass channel 70 further includes at least one embossment 25, 27 formed therein. The gas diffusion layer 70 may be disposed between the first bipolar plate 12 and the second bipolar plate 14 while the first and second sub-gaskets 26, 28 are disposed on each side of the gas diffusion layer 21, 23 such that the first and second sub-gaskets 26, 28 are secured between the metal bead seals 24 of two bipolar plates 12, 14.

Figure 1B:
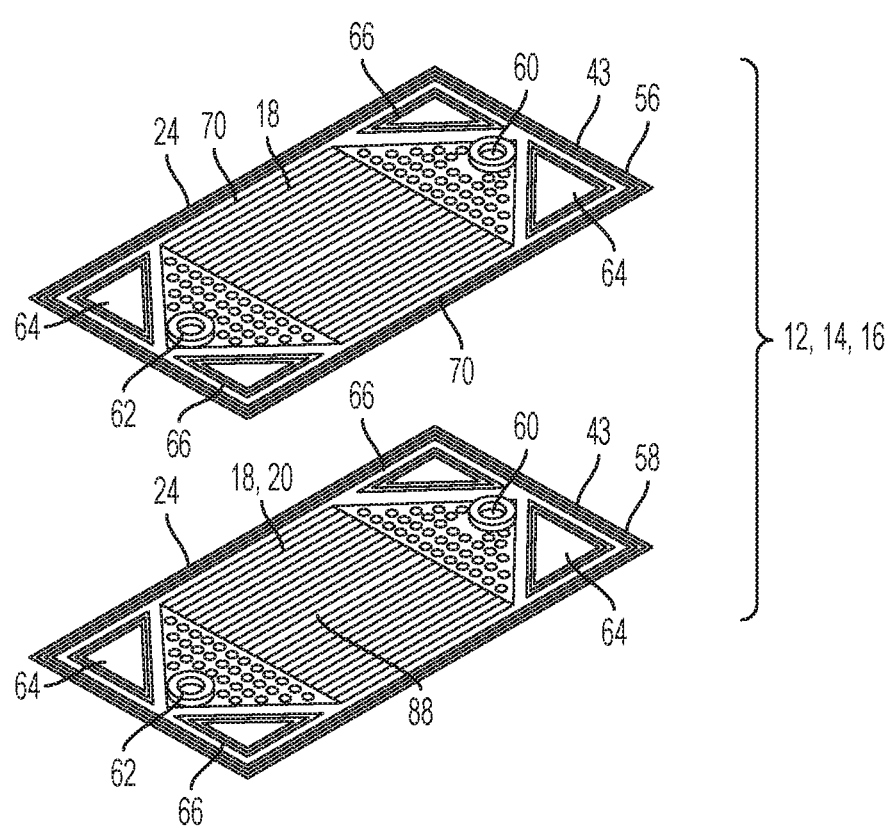
FIG. 1B is an expanded, schematic view of a non-limiting example bi-polar plate.

With reference to FIG. 1B, metal elements 56, 58 of a non-limiting example bipolar plate 12, 14, 16 are shown. Each inner metal element 56 attaches to the outer metal element 58 to define the coolant flow path 68 (shown in FIG. 2). Metal elements 56, 58 define channels 18, 20, 22 which may, but not necessarily be in the form of serpentine channels which are operatively configured to distribute the reactants over the corresponding gas diffusion layer 21, 2.3 (shown in FIG. 1).

Fuel manifold holes 64 (for Hydrogen) are provided for supply and removal. Oxidant manifold holes 66 (for Oxygen) are also provided for supply and removal. While the manifold holes shown in FIG. 1B are shown as triangles, the manifold holes may be round, rectangular or any shape. Fuel manifold seal areas and oxidant manifold seal areas are at the periphery of the fuel manifold holes and the oxidant manifold holes 66. The manifold seal areas may extend in a substantially perpendicular direction from the surface of the inner/outer metal element 56, 58 in order to provide contact with the corresponding MEA (shown as elements 8, 10 in FIG. 1A). Oxidant manifold holes 66 provide oxidant flow only to and from the cathode chamber.

Figure 3:
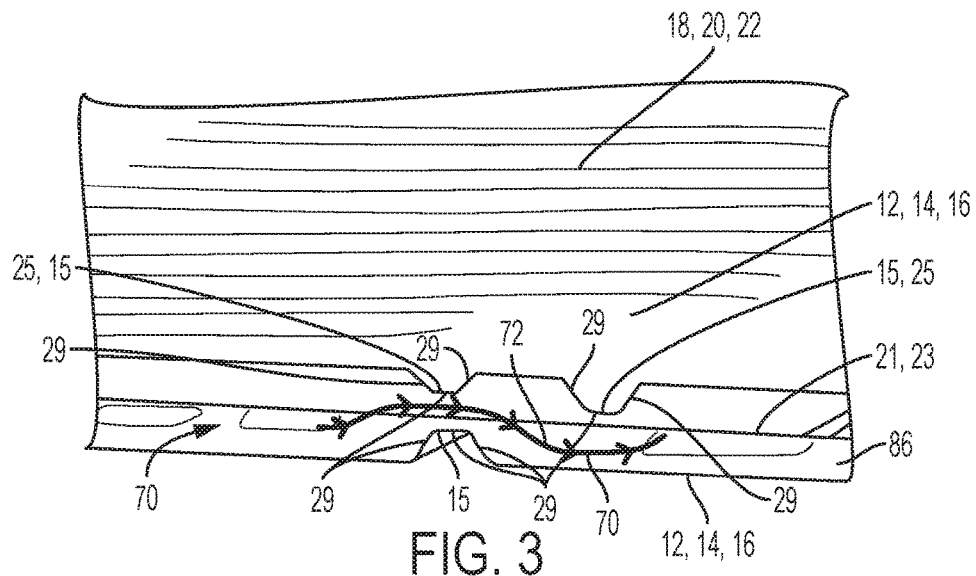
FIG. 3 is an isometric, schematic, cross-sectional view of a first non-limiting example of a PEM fuel cell stack of the present disclosure.
Figure 4:
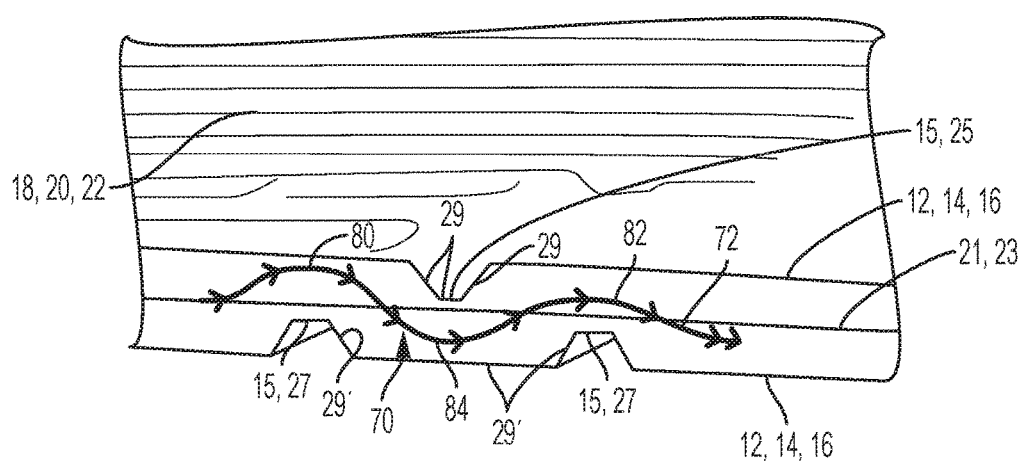
FIG. 4 is an isometric, schematic, cross-sectional view of a second non-limiting example of a PEM fuel cell stack of the present disclosure.

Referring now to FICA. 6A and 6B, a plan view of a non-limiting example of the present disclosure is provided where the gas diffusion layer 21, 23 and sub-gasket 26, 28, 30, 32 are disposed on the corresponding bipolar plate 12, 14, 16 having a wavy metal bead seal 24 with embossments 15 in a bypass channel 70. The embossments 15 (which may have various configurations) of the bipolar plate 12, 14, 16 may extend away from the surface of the bipolar plate 12, 14, 16 into the bypass channel 70 in order to disrupt the direction of the bypass gas flow 72 (as shown in FIGS. 3-5). Accordingly, the embossments 15 slightly increase the pressure in the bypass channel 70 as the bypass gas flow 72 is disrupted which therefore directs the reactant gases from the input valve toward the gas diffusion layer 21, 23 such that reaction efficiency is increased.

Referring now to FIGS. 3-5, an isometric, schematic cross-sectional view of a various non-limiting examples of a PEM fuel cell stack 11 of the present disclosure are shown. In each of FIGS. 3-5, various configurations are shown where embossments 15 in the bipolar plates 12, 14, 16 disrupt the direction of the reactant bypass flow 72 in the bypass channel 70. The turbulent path of the reactant gas flow 72 in the bypass channel 70 increases pressure in the bypass channel 70 and therefore, encourages reactant gases that are at the entry point of the bypass channel, or may even be in the bypass channel 70, to flow toward the gas diffusion layer 21, 23 (instead of directly from the input valve to the output valve via the bypass channel 70). Accordingly, the input gases are more likely to react with the gas diffusion layer 21, 23 thereby causing greater efficiency and a higher reaction rate.

Accordingly, a fuel cell stack assembly 11 is provided which includes a first bipolar plate 12, a second bipolar plate 16, first and second sub-gaskets 30, 32 and a gas diffusion layer 21, 23. The second bipolar plate 14 defines a bypass channel 70 with the first bipolar plate 12 at each lateral side 45 of the gas diffusion layer 21, 23. The second bipolar plate 14 may include a second plate embossment 27 formed in the second bipolar plate 14 where at least a portion of the second plate embossment 27 is formed in the bypass channel 70. The second plate embossment 27 is operatively configured to restrict the path of the reactant bypass flow 72. The gas diffusion layer 23 may be disposed between the corresponding first and second bipolar plates 12, 16.

As shown, in FIGS. 3-5, the second plate embossment 27 may be operatively configured to change the direction of the reactant bypass flow 72 given that the reactant bypass flow 72 is unable to move in a straight path due to the changing angles of the embossment surface 29 of the second bipolar plate 14 at the second plate embossment 27. It is understood that the second plate embossment 27 may be a single embossment (detent/recess 19 shown in FIG. 6B or tunnel 17 shown in FIG. 6A) formed in the second bipolar plate 14 as shown in FIG. 3. Alternatively, the second plate embossment 27 may be a plurality of embossments formed in the second bipolar plate 14 as shown in FIG. 5.

Similar to the second plate embossment 27, the first plate embossment is also operatively configured to change the direction of the reactant bypass flow 72 given that the reactant bypass flow 72 is unable to move in a straight path due to the changing angles of the surface of the first bipolar plate 12 at the first plate embossment 25. It is understood that the first plate embossment 25 may be a single embossment (detent or tunnel 17) formed in the first bipolar plate 12 as shown in FIG. 4. Alternatively, the first plate embossment 25 may be a plurality of embossments formed in the first bipolar plate 14 as shown in FIG. 5.

Figure 6A:
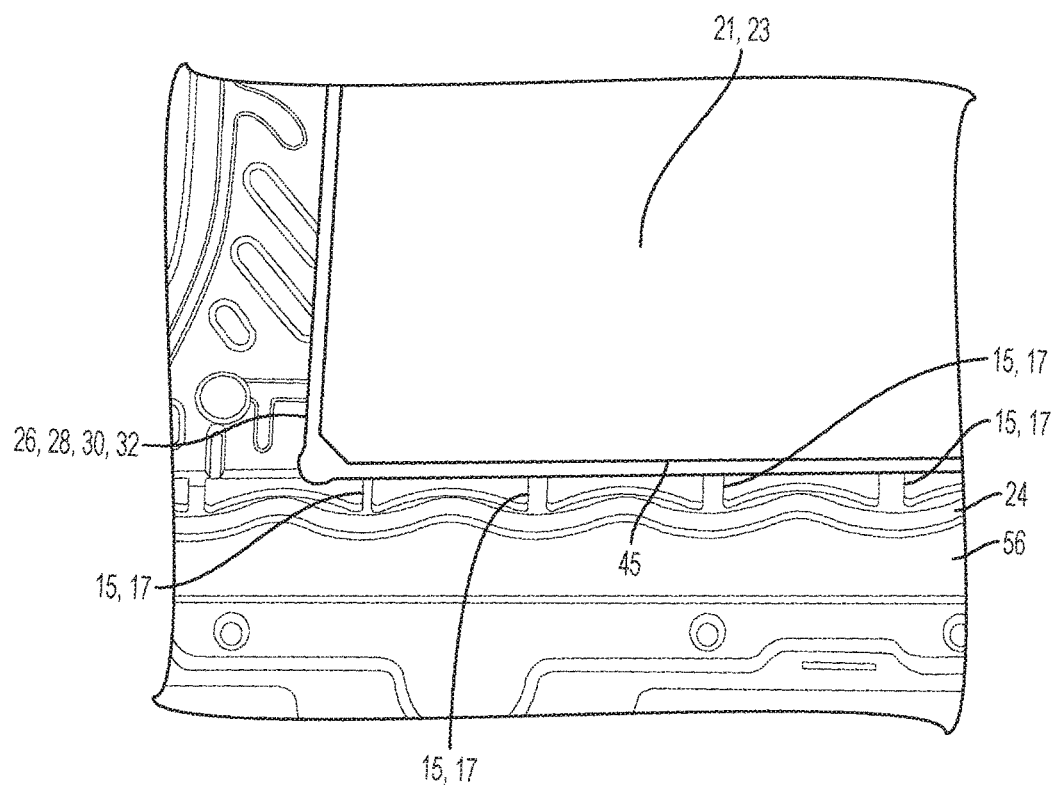
FIG. 6A is a schematic plan view of a non-limiting example of the present disclosure where the gas diffusion layer is disposed on a bipolar plate having a metal bead seal with recess-type embossments formed in the bypass channel.

The first and second plate embossments 25, 27 may be tunnels 17 (as shown in FIG. 6A) which are formed in an inner metal element 56 for each of the first and second bipolar plates 12, 14. The tunnels 17 may have varying length. However, some or each tunnel 17 may be shortened such that the tunnel 17 does not interfere with the gas diffusion layer 21, 23. It is understood that the gas diffusion layer may be sensitive to compressive forces from the inner metal elements 56 of the first and second bipolar plates 12, 14 and therefore, it may be undesirable to include tunnels 17 which are disposed above or below the gas diffusion layer 21, 23 due to the compressive forces that the tunnels 17 may present to the gas diffusion layer 21, 23.

Figure 6B:
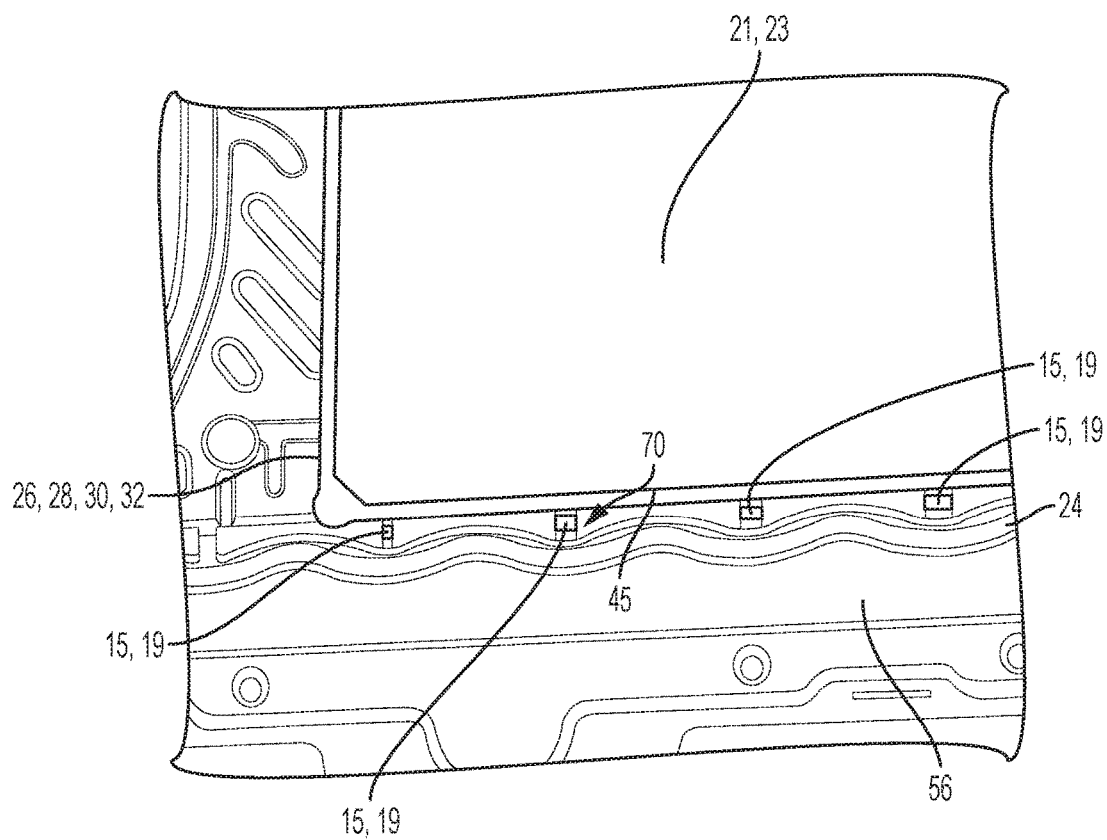
FIG. 6B is a schematic plan view of a non-limiting example of the present disclosure where the gas diffusion layer is disposed on a bipolar plate having a metal bead seal with tunnel-type embossments formed in the bypass channel.

Moreover, where the first and/or second embossments 25, 27 are provided in the form of tunnels 17, such tunnels 17 may, but not necessarily, be disposed in a substantially perpendicular direction (as shown in FIG. 6A) relative to the metal bead seal 24 such that embossments 15 prevents the reactant bypass flow 72 from traveling in a straight direction. Alternatively, in yet another non-limiting example, the first and second plate embossments 25, 27 may be provided in the form of a recess (or recesses) 19 defined in the bypass channel 70 as shown in FIG. 6B. Accordingly, the first and/or second embossments 25, 27 formed in the bypass channel 70 causes the reactant bypass flow 72 to experience turbulence due to the changing angle of the embossment surface 59. Accordingly, this causes increased pressure in the bypass channel 70 and urges the reactants in the bypass channel 70 toward the gas diffusion layer 21, 23 instead of directly to the output valve. This results in an improved reaction rate between the reactants and the gas diffusion layer 21, 23 thereby improving efficiency in the fuel cell stack 11.

Referring now to FIGS. 3 and 4, a non-limiting example of the fuel cell stack assembly 11 is shown where a first plate embossment 25 is formed in a first bipolar plate 12 and a second embossment 27 is formed in a second bipolar plate 14 such that the first plate embossment 25 is at a predetermined distance away from the second plate embossment 27. It is also understood that the present disclosure contemplates a configuration where the first plate embossment 25 may be "nested" in the metal element of the second bipolar plate 14 such that at least a portion of the second bipolar plate 14 may have changing surfaces in the metal element that correspond to the changing angle of embossment surfaces 29 of the first plate embossment 25 as shown in FIG. 4. The corresponding directional changes in the embossment surfaces 29 for both the first and second bipolar plates 12, 14 prevents needless compression and tension forces in the gas diffusion layer 21, 23. As noted, the life cycle of the gas diffusion layer 21, 23 may degrade due to excessive compression and tension forces.

Figure 7:
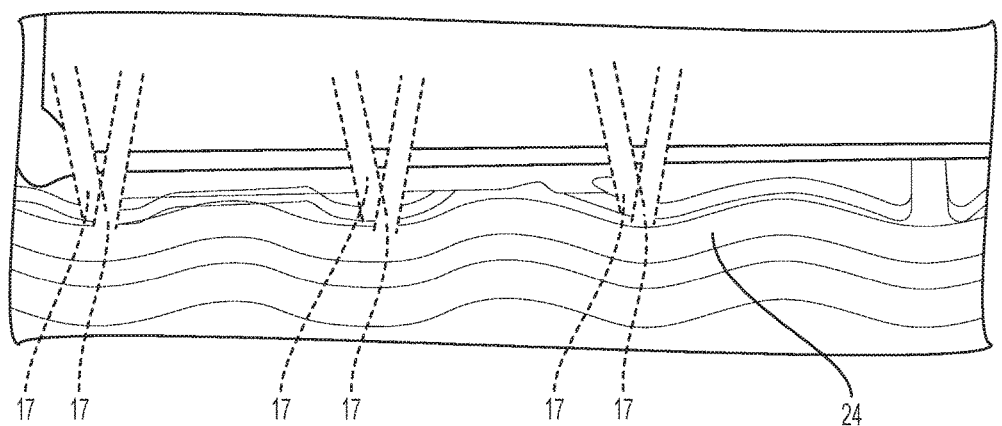
FIG. 7 is a plan schematic view of an embodiment of the present disclosure where the tunnels diverge further away from the metal bead seal.

Referring again to FIG. 4, it is further understood a first plate embossment 25 may also be "nested" between tunnels 17 or recesses 19 of the second plate embossment 27 thereby causing reactant bypass flow 72 to be redirected three times at 80, 82, 84 as the reactant flow 72 travels down the bypass channel 70. As shown in FIGS. 3-6A/6B, the first and second plate embossments 25, 27 may, but not necessarily, be disposed along the length of the bypass channel 70 or each bypass channel 70 disposed on either side of the gas diffusion layer 21, 23. It is also understood that the tunnels (or tunnel embossments) 17 may be aligned as the tunnels come out of the metal bead seal and the tunnels may have a reduced embossment height from the metal bead seal so that the seal functions properly. As the tunnel embossment 17 distance from the metal bead seal embossment increases, the present disclosure provides for both a tunnel embossment height increase and a tunnel embossment path modification. The tunnel embossment path modification may be such that the tunnel embossments 17 of adjacent plates may start to diverge from each other so that as the heights in the tunnel embossments increase there is not material interference, as shown in FIG. 7.

Figure 2:
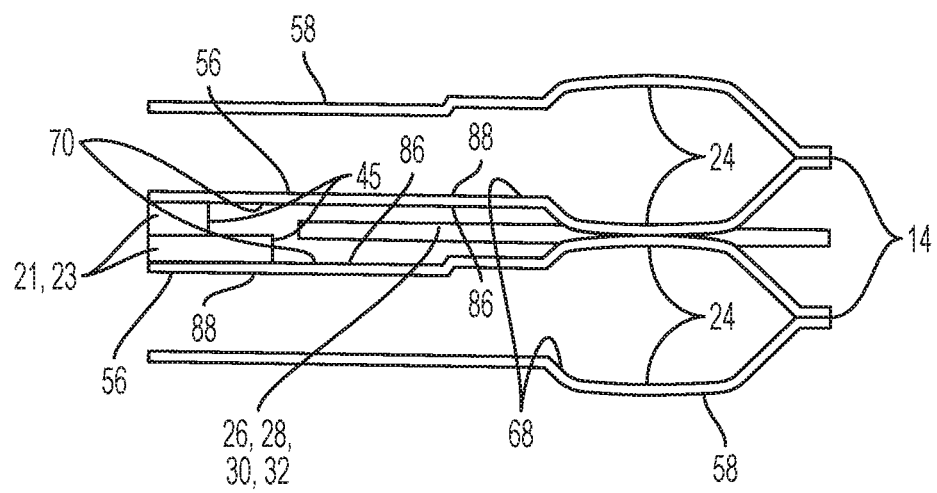
FIG. 2 is a cross-sectional, schematic view of the bypass channel of FIG. 5 along lines 2-2.

Referring now to FIG. 1B and FIG. 2, a bipolar plate is shown which may be a first bipolar plate 12 or a second bipolar plate 14. As shown in FIG. 2, each of the first and second bipolar plates 12, 14 is formed from two metal elements 56, 58 (shown in FIG. 1B). The "inner" metal element 56 which may be disposed proximate to the gas diffusion layer 21, 23 includes a first side defining a reactant flow field 18 (shown in schematic FIGS. 3 and 4) and a second side defining a coolant flow field (FIG. 1B). The reactant flow field 18 is a predetermined flow field pattern 18 which may be in the form of this example, non-limiting list: wiggled pattern, straight pattern or serpentine pattern. The predetermined flow field pattern may be adjacent to the face of the gas diffusion layer. The coolant flow field 68 (shown in FIG. 2) is defined between the two metal elements 56, 58 for each first and second bipolar plates 12, 14. The coolant and reactant flow fields (FIGS. 1A and 1B) may configured in a variety of forms. Non-limiting example configurations for the reactant and coolant flow fields may be a serpentine path schematically shown in FIG. 1A or multiple parallel channels as shown in FIG. 1B, wiggled channels as noted above.

Figure 8A:
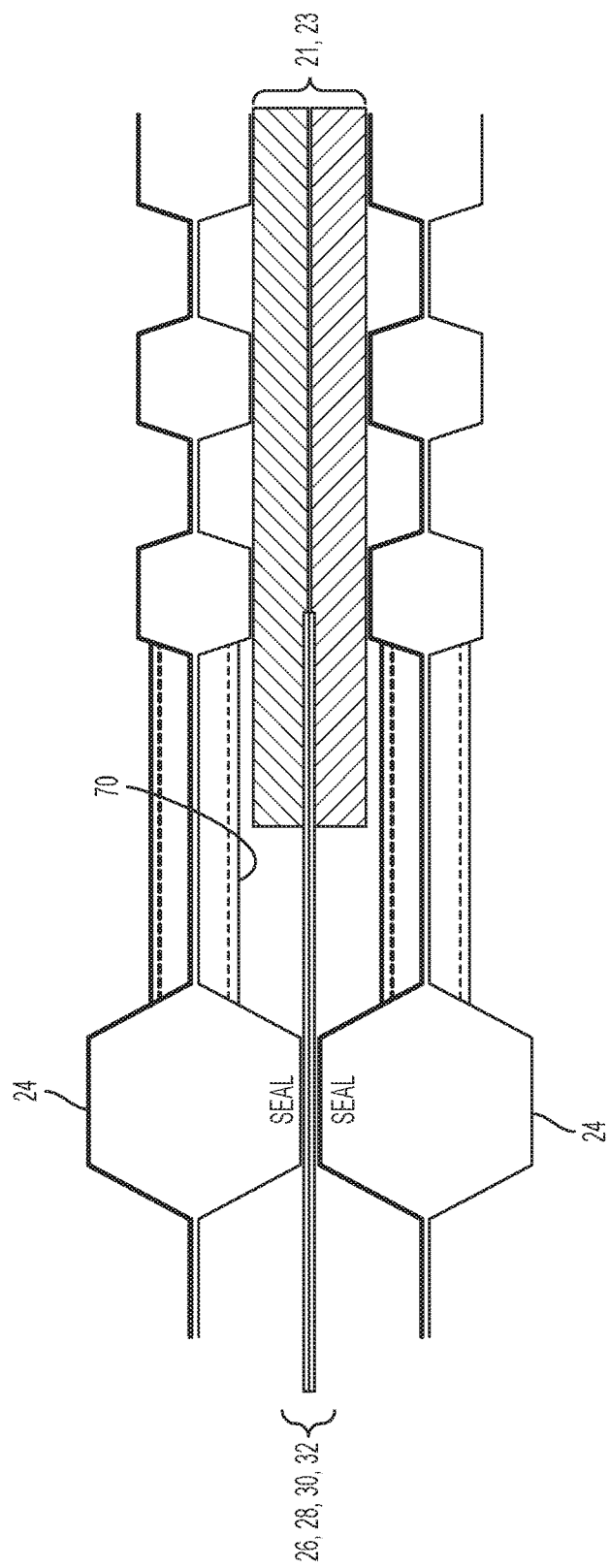
FIG. 8A is a cross sectional view of an embodiment of the present disclosure showing a cross-sectional view of a portion of the bypass channel where the gas diffusion layer and the sub-gasket are not bent.

With reference to FIG. 8A, a cross sectional view of the bypass channel is shown where there are no embossments. In FIG. 8A, the reactant gas flow 72 moves straight through the bypass channel 70 where there are no embossments. With reference to FIG. 8B, a portion of the first and second sub-gaskets 26, 28, 30, 32 as well as the gas diffusion layer 21 bend in a second direction within the bypass channel 70 at a first plate embossment 25 causing restriction and a change in direction for the reactant gas flow 72. With reference to FIG. 8C, another portion of the first and second sub-gaskets as well as the gas diffusion layer bend in a first direction within the bypass channel 70 at a second plate embossment 27 causing restriction and a change in direction for the reactant gas flow 72.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A fuel cell stack assembly comprising:
a first bipolar plate;
a second bipolar plate defining a second plate embossment and defining a supply manifold hole and a removal manifold hole with the first bipolar plate;
a first sub-gasket disposed adjacent to the first bipolar plate, and a second sub-gasket disposed adjacent to the second bipolar plate; and
a gas diffusion layer disposed between the first bipolar plate and the second bipolar plate within an internal periphery of the first and second sub-gaskets;
wherein the gas diffusion layer, the first bipolar plate and the second bipolar plate define a bypass channel configured to fluidly couple the supply manifold hole to the removal manifold hole and the gas diffusion layer, the bypass channel being disposed between a metal bead seal and a lateral side of the gas diffusion layer, and the second plate embossment partially extending into the bypass channel.

2. The fuel cell stack assembly of claim 1 wherein the second plate embossment is operatively configured to disrupt the reactant bypass flow moving through the bypass channel.

3. The fuel cell stack assembly of claim 1 wherein the second plate embossment is operatively configured to restrict a path of the reactant bypass flow.

4. The fuel cell stack assembly of claim 1 wherein a first plate embossment is formed in the first bipolar plate extending into the bypass channel and the second plate embossment is formed in the second bipolar plate at a predetermined distance away from the first plate embossment.

5. The fuel cell stack assembly of claim 1 wherein each of the first and second bipolar plates further comprises a metal element having a first side defining a reactant flow field and a second side defining a coolant flow field.

6. The fuel cell stack assembly of claim 1 wherein the bypass channel is disposed adjacent to each lateral side of the gas diffusion layer.

7. The fuel cell stack assembly of claim 1 wherein the first bipolar plate further comprises a first plate embossment partially extending into the bypass channel and operatively configured to nest with the second plate embossment.

8. The fuel cell stack assembly of claim 1 wherein the second plate embossment is a tunnel formed in the second bipolar plate.

9. The fuel cell stack assembly of claim 1 wherein a portion of the first and second sub-gaskets and the gas diffusion layer bends at the second plate embossment.

10. The fuel cell stack assembly of claim 4 wherein a portion of the first and second sub-gaskets and the gas diffusion layer bend at the first plate embossment.

11. The fuel cell stack assembly of claim 4 wherein the first plate embossment is a tunnel formed in the first bipolar plate.

12. The fuel cell stack assembly of claim 5 wherein the reactant flow field is in the form of a predetermined flow field pattern directly adjacent to a face of the gas diffusion layer to encourage a reaction between.

13. The fuel cell stack assembly of claim 7 wherein the first plate embossment and the second plate embossment are operatively configured to alter the direction of the reactant bypass flow.

14. The fuel cell stack assembly of claim 7 wherein the first plate embossment and the second plate embossment are operatively configured to restrict a path of the reactant bypass flow.

15. The fuel cell stack assembly of claim 7 wherein the first plate embossment and the second plate embossment are tunnels formed in a metal element from each of the first bipolar plate and the second bipolar plate.

* * * * *